Feb. 18, 1930. M. L. JEFFREY 1,747,672
METHOD AND APPARATUS FOR LINING BRAKE BANDS
Filed Feb. 23, 1926 2 Sheets-Sheet 1
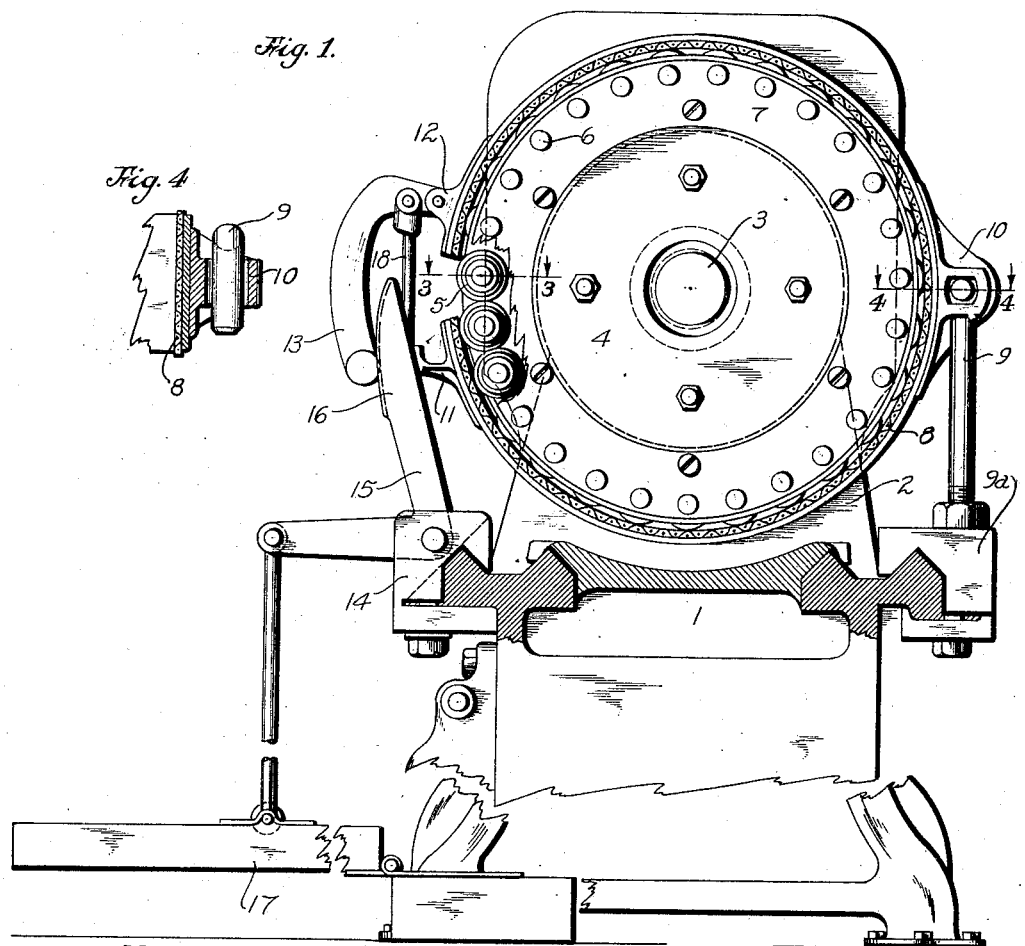
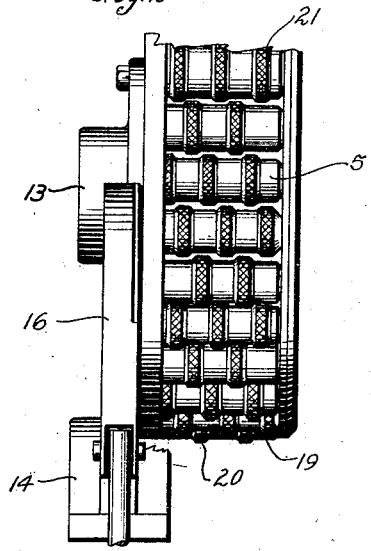
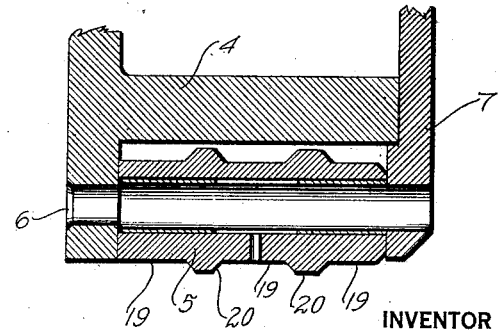
INVENTOR
MAX L. JEFFREY
BY
Richey & Watts
ATTORNEYS

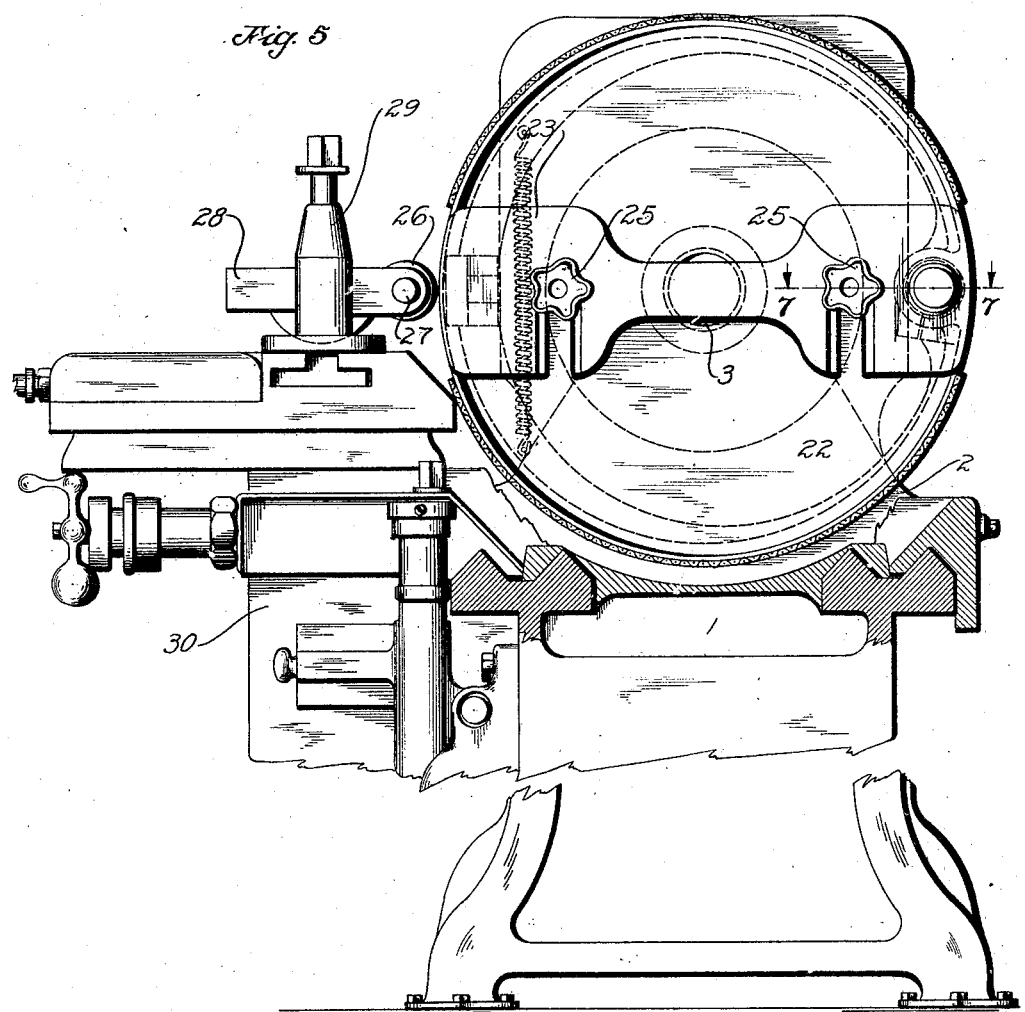
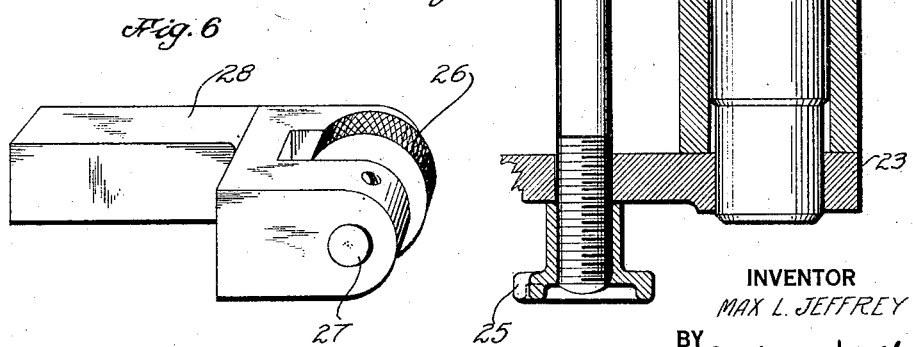

Patented Feb. 18, 1930

1,747,672

UNITED STATES PATENT OFFICE

MAX LEROY JEFFREY, OF CLEVELAND, OHIO, ASSIGNOR TO THE WHITE MOTOR COMPANY, OF CLEVELAND, OHIO, A CORPORATION OF OHIO

METHOD AND APPARATUS FOR LINING BRAKE BANDS

Application filed February 23, 1926. Serial No. 90,084.

This invention relates to a method of applying a flexible material, such as brake band linings, to a supporting means, such as brake bands or shoes for automobiles, and apparatus for performing this method.

An object of this invention is to provide a method which will cause the flexible material to fit snugly on its supporting member.

Another object is to provide such a method which may be quickly and economically practiced in manufacture.

Another object is to provide simple and efficient apparatus for performing said method.

Other objects will hereinafter appear.

Heretofore linings have been applied to the brake bands of automobiles and the like generally by hand. One manner of applying the lining was to partly straighten the brake band, which normally is substantially circular in shape, place the lining upon the surface of the band and rivet both ends thereto. After this the band was allowed to assume its normal shape. If the lining were placed on the interior of the band the rivets were forced nearer to each other circumferentially thereof by the band assuming its normal shape and the lining was then placed under compression which compression was relied on to cause the lining to fit tightly within the band. Sometimes the lining was cut even longer than the distance between the rivets when the band was straightened and so was forced to bulge away from the band even before this has assumed its normal shape. The bulges were forced down by hand, after the band had been allowed to regain its circular form, and thus increased the compression in the lining.

These linings had a tendency to wrinkle in folds at various points, necessitated considerable labor in being fitted to the bands, and were soft and uncompressed when first placed in service after which they rapidly become compressed and necessitated frequent adjustments of the brake operating mechanism during the first few hundred miles that the car was run after the installation of the new lining. Moreover, the lining projects in circular ridges or "blisters" surrounding the rivets, due to the pressure of the rivets upon the lining. These ridges had to be removed, as by grinding, to prevent frequent adjustment of the brakes while they were being worn down or compressed.

According to the present invention the lining may be applied to such a brake band, either internally or externally thereof, and caused to fit snugly against the same throughout its length. Furthermore, it may be compressed while being fitted to the band so that when placed in service no further substantial compression takes place and it is, therefore, unnecessary to adjust the brake mechanism until the lining has worn to such an extent as to render this necessary.

The invention will be better understood from the description of two practical embodiments of the apparatus and the description of the operation thereof illustrated in the accompanying drawings in which—

Fig. 1 is a transverse view, partly in section, of a part of a lathe provided with means for applying linings to the interior of a brake band designed to contract on the exterior of the brake drum;

Fig. 2 is a fragmentary elevation of part of the mechanism shown in Fig. 1;

Fig. 3 is a section taken on line 3—3 of Fig. 1;

Fig. 4 is a section taken on line 4—4 of Fig. 1;

Fig. 5 is a transverse view, partly in section, of the machine provided with an apparatus for applying lining externally to a brake shoe for a brake mechanism which expands in the interior of the brake drum;

Fig. 6 is a perspective view of the applying tool; and

Fig. 7 is a section taken on line 7—7 of Fig. 5.

The apparatus is shown as applied to a lathe which consists of a bed 1 and a headstock 2 carrying shaft 3. In Fig. 1 a face plate 4 is provided with an annularly extending series of rollers 5 carried by pins 6 which are mounted in the face plate and a supporting ring 7 attached thereto. The series of rollers is rotated by the drive mechanism of the lathe and the brake band is restrained from moving and compressed about the rollers so that they may roll upon the lining and press this tightly against the band.

The brake band is illustrated at 8 and is supported by a hook bolt 9 which engages an apertured lug 10 which is a part of the assembled band. The bolt 9 is supported in a clamp 9ª attached to the ways of the lathe.

The ends of the band are provided with lugs 11 and 12 by which the band is operated when installed on an automobile and with lever 13 which is likewise a part of the completed band. A clamp 14 is carried by the ways of the lathe and is provided with a bell crank 15 having a cam shaped surface 16 which engages the end of lever 13. The other arm of the bell crank is actuated by a rod and pedal 17 pivoted near the lower part of the lathe's base.

The band is readily placed about the series of rollers by being slid axially of the lathe, the lug 10 engaging the end of the bolt 9; and lever 13, the cam surface 16. Previously to being so introduced into the lathe, the lever 13 and lug 11 are tied together by a rod 18 which provides a fulcrum for the lever.

It will be seen that when the pedal 17 is depressed, the brake band is contracted upon the surface of the rollers and that it is restrained from rotation by the hook bolt and to some extent by the bell crank. If now the shaft 3, and with it the series of rollers 5, be rotated it will be seen that these rollers will press the lining against the brake band with a force proportional to that applied to pedal 17 and that the points of pressure will travel about the interior surface of the band.

If the rollers are cylindrically shaped throughout their length, the lining will not be properly pressed against the band due, probably, to the distribution of pressure. The rollers are therefore made in the form shown in Figs. 2 and 3 in which the greater part of each roller is reduced in diameter as shown at 19 leaving a few projecting annular ridges 20 which alone engage the lining to force the same against the band. As clearly shown in Fig. 2 the relation of these ridges in successive rollers is varied so that the entire surface of the lining may be pressed against the band in rotating the series of rollers. The rollers are found to be much more efficient in operation if the surface of the ridges be knurled, serrated or otherwise roughened, as shown at 21, and the term "knurled" hereinafter indicates any suitable manner of roughening.

In the form of device shown in Figs. 5, 6 and 7, the brake band is in the form of an internally expanding shoe having the lining applied to its exterior. The shoe is clamped in a fixture 22 carried by the shaft 3, the clamping means being illustrated as a bar 23 retained in place by bolts 24 and threaded hand wheels 25. The lining is forced against the shoe by a single knurled roller 26 rotatably mounted about a shaft 27 in the bifurcated end of a bar 28. This bar is adapted to be mounted in the usual tool post 29 carried by the carriage 30 of the lathe and to be moved along the ways of the lathe and toward and from the axis of shaft 3 by the usual lathe mechanism.

In operation the brake shoe is clamped in fixture 22 by the bar 23, the lining is placed on its exterior, and the fixture and shoe rotated by the lathe drive mechanism. Roller 26 is pressed against the lining by the usual radial feed mechanism of the carriage and, as the brake shoe is rotated, the carriage is moved longitudinally of the ways of the lathe so that the entire surface of the lining is pressed against the brake shoe.

By pressing small and relatively narrow sections of the lining at one time the lining is caused to fit much more snugly upon the brake band or shoe and is compressed to a degree commensurate with an ordinary brake band lining which has been in service for several hundred miles. It will thus be seen that not only is the method and apparatus disclosed herein simple and efficient in applying the lining but that it prevents the necessity for adjustment to the brakes which must otherwise be made during the period in which the lining is becoming compressed.

While I have described two practical embodiments of the apparatus for performing my invention, it is obvious that many modifications and changes may be made therein without departing from the scope of the invention. The invention may be applied to various types of brake bands and shoes and I include all such bands and shoes within the term "brake band" as used in the claims. I, therefore, do not wish to limit myself to the precise details herein shown and described but claim as my invention all variations and modifications thereof which come within the scope of the subjoined claims.

What I claim is:

1. The process of applying brake band linings which comprises applying pressure to a plurality of spaced small areas thereof, forcing these areas against the brake band, and moving the points of application of said pressure successively about the band so that all points will be forced against the brake band.

2. The process of applying a brake band lining which comprises pressing a series of narrow rollers against small spaced areas of a lining and relatively moving the lining and roller to cause every particle of the surface of the lining to be traversed by a roller.

3. An apparatus for applying brake band linings comprising a series of annularly arranged, staggered, narrow rollers, holding means for brake bands, means for clamping said rollers against said band and means for relatively moving said band and rollers.

4. The process of applying brake band lining which comprises forcing areas, of small length and width relative the overall dimensions of the lining, successively against a brake band until its entire area has been so subjected to pressure.

5. The process of applying brake band lining which comprises applying pressure to a plurality of circumferentially and axially spaced small areas thereof, forcing the same against the brake band and moving the points of application of pressure successively about the band, so that all points will be forced against the band.

6. An apparatus for applying brake band lining comprising a roller, narrow relative the width of the lining, means for holding the brake band, means for pressing the roller against the brake band lining, and means for relatively moving the band and roller.

7. An apparatus for applying brake band linings comprising a knurled roller of small diameter and width relative the brake band, means for holding the brake band, means for pressing the roller against the lining, and means for relatively moving the roller and brake band.

In testimony whereof I hereunto affix my signature this 15th day of February, 1926.

MAX LEROY JEFFREY.